Patented Oct. 11, 1932

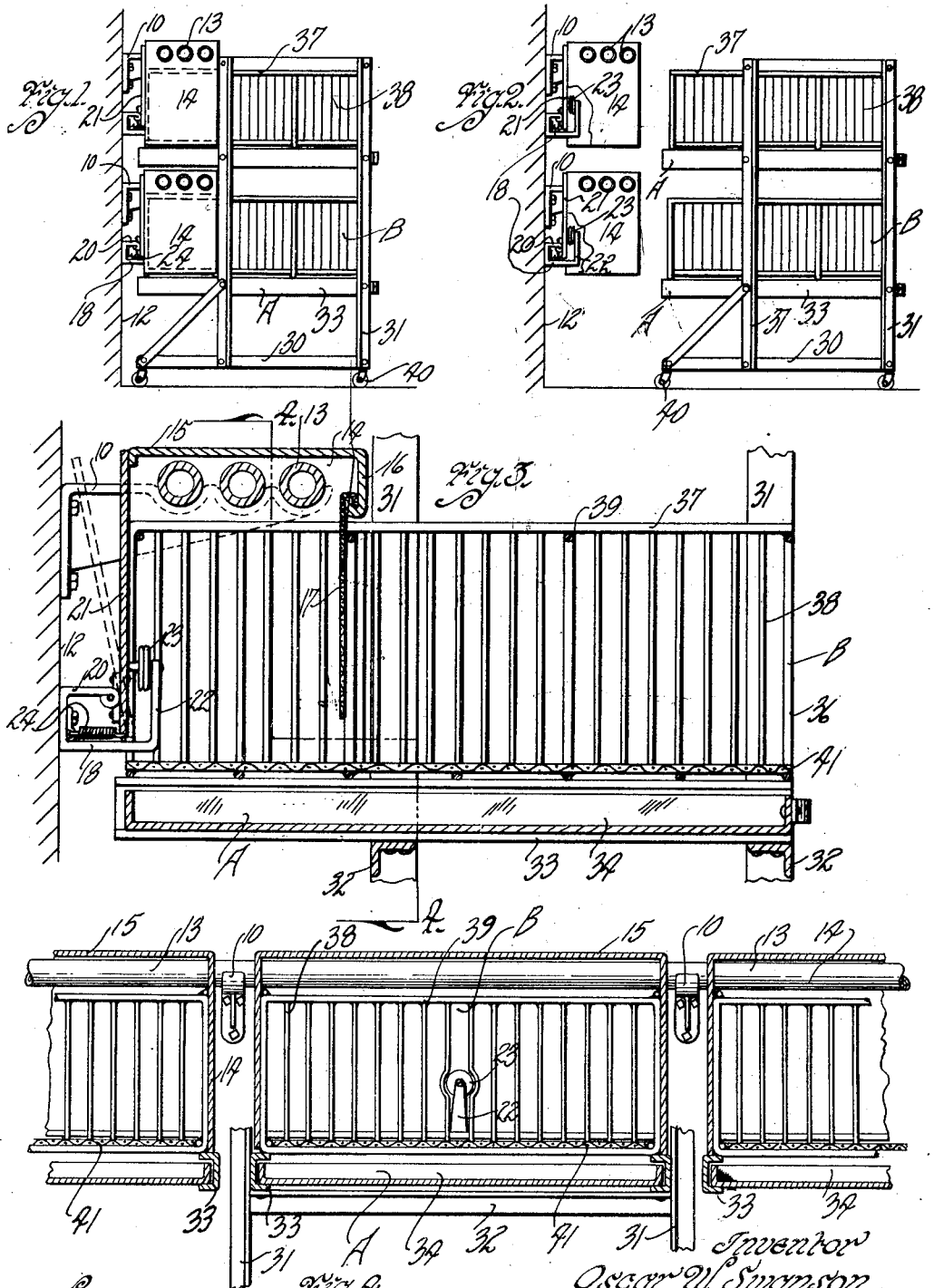

1,882,342

UNITED STATES PATENT OFFICE

OSCAR W. SWANSON, OF OTTUMWA, IOWA

APPARATUS FOR HEATING BROODERS

Application filed August 25, 1930. Serial No. 477,654.

My invention has to do with an apparatus for heating brooders by means of a fixed heating device and a brooder movable for cooperating with the heating device.

A further object is to provide a number of details of construction forming part of the apparatus, whereby the operation of the apparatus may be conveniently facilitated.

Another particular object of my invention is to provide a substantially permanent heating device having parts so constructed and arranged that a brooder constructed in the general form of a wire cage or equivalent thereto may be wheeled up or otherwise moved up to the heating device and a brooder compartment will then be automatically formed.

Still a further object of my invention is to provide such a heating device having means whereby the temperature of the brooder compartment thus formed will be automatically controlled and regulated.

With these and other objects in view, my invention consists in the construction, arrangement and combination of the various parts of my apparatus, whereby the objects herein contemplated are attained, as hereinafter more fully set forth, pointed out in my claims, and illustrated in the accompanying drawing, in which:

Figure 1 is a vertical, sectional view through a heating apparatus embodying my invention, one of the brooders being illustrated in end elevation.

Figure 2 is a similar view with the brooder moved away from the heating apparatus, parts of the heating apparatus being broken away.

Figure 3 is a vertical, sectional view through a portion of the brooder and a portion of the heating apparatus; and Figure 4 is a detail, sectional view taken on the line 4—4 of Figure 3.

It is my purpose to provide in a room where young chicks for instance are raised on a considerable scale and a number of brooders are employed, a permanent heating means having a plurality of units arranged at proper intervals so that a brooder may be rolled up to one of these heating devices, the parts being so arranged as to then provide a warmed brooder compartment. The brooder may be moved away whenever it is desired.

For accomplishing my purpose, I provide in a room a series of brackets indicated in the drawing by the reference numeral 10, which project out from the wall 12 of the room. These brackets support suitable heating means as for instance the steam or hot water pipes 13. I do not desire to limit myself to any particular form for the heating means or each heating device, but as shown in the drawing for purpose of illustration, there are provided two rows of pipes 13 for steam or hot water, each row having three pipes in the same horizontal plane and one row being located substantially above the other.

I provide a series of heating device units in the following manner:

When the pipes are assembled, I slip on to them a series of heating unit members, each comprising two end walls 14 and a connecting top 15. At the front of each of these tops 15 is a short down-turned wall 16 from which hangs a flexible brooder wall 17, preferably of canvas or the like for forming the front of the brooder compartment. For forming the back of the brooder compartment, I provide a movable door.

For each of these heating device units, I mount on the wall 12 a bracket 18 having an upper projecting arm 20 to which is pivoted or hinged a door 21. Each bracket 18 has at its outer end an upright arm 22 which carries a thermostatic wafer 23. The lower end of the door 21 projects below the arm 20 and is connected to a coil spring 24 which is in turn secured to the bracket 18 for normally tending to swing the upper end of the door 21 away from the wall 12. This movement of the door 21 away from the wall 12 is limited by the contact of the door with the wafer 23. The swinging of the door in the other direction is limited by the wall and by the tension of the spring 24.

The door 21 forms what might be called a wall of a brooder compartment. If the canvas 17 is the front wall then the door 21 is the rear wall, as will be hereinafter made clear.

I preferably arrange these heating units in pairs one above the other, as shown for instance in Figures 1 and 2.

For cooperation with the heating device units, I provide the portable brooders as illustrated in the drawing. Each brooder preferably consists of a lower frame 30 having the four uprights 31 connected by longitudinal cross frame members 32 in the form of angle bars and side cross frame members 33 in the form of channels, open toward each other as shown in Figures 2 and 4 for example.

These channels 33 project in what I will for convenience call a rearward direction from the frame formed by the members 31, as shown best perhaps in Figure 2, the projecting portions being indicated at A. The channels are so arranged that pans 34 may be slipped into them as illustrated in Figures 3 and 4 for receiving the droppings.

I place on the channels 33 brooder coops or cages indicated generally at B, preferably made of wire. These brooder cages have rectangular wire frames 36 and 37 at their tops and bottoms and upright connecting wires 38. At the top, there are only a few cross bars 39.

The brooder cages B project from the frame members 31 rearwardly as do the portions A of the channels 33.

This structure is adapted to permit the movable brooders consisting of the frames and cages above described to be moved on the castor wheels 40 to position where the projecting portions of the brooder cages B' will cooperate with one of the heater device units above described. The projecting portion of the brooder cage B will be below one of the tops 15 with its rear end close to the door 21.

If the brooder is moved straight inwardly, the canvas wall member 17 will drop drown as shown in Figure 3. There will thus be formed a brooder compartment having the top 15, the front wall 17, the end walls 14 and the rear wall formed by the door 21.

Each of the brooder cages preferably has a foraminous bottom 41 of screen wire or the like.

When the brooder has been moved up to cooperate with the heating device unit, it will be seen that there will be provided a brooder compartment which will be warmed from the pipes 14.

If the heat becomes too great, the thermostatic wafer 23 will actuate the door 21 to move it from its full line position shown in Figure 3 toward its dotted line position shown in that figure for allowing air to pass freely out of the brooder compartment.

If the temperature in the brooder compartment drops below a certain predetermined figure, the wafer 23 will be actuated to permit the spring 24 to return the door 21 toward or to closed position.

There is thus provided a structure comprising a heating device unit and a brooder structure made in parts so that when the brooder structure is moved up to the heating device unit, a brooder compartment will automatically be formed. The temperature of this brooder compartment is controlled as already explained.

When it is desired to move the brooder cages away, that can easily be done.

There are a number of advantages to a structure of this kind. Where chickens are raised on a large scale, it is necessary to have a warm room and steam or water may be conveniently employed for this purpose. Where a warm room is available, the provision of heating device units of this kind for cooperation with the brooder is substantially cheaper than providing an electric or other heating unit for each brooder. I find it easier also to constantly maintain proper temperature conditions where the brooders are kept in a warm room connected with the fixed heating device units as herein explained.

The entire brooder cage may be used for the fowls without any dark compartment when the brooder cage is pulled away from the heater device unit, and the device is therefore more economical of space than a brooder having a dark brooder compartment at all times.

Another advantage of this structure arises from the fact that when feeding time comes, the brooder can be moved away from the heating device unit, and the feeding troughs can be hung entirely around the brooder cages. This is not true of the brooder cage where part of the cage is used for a brooder compartment. As result, it follows that with my device, the chicks can feed entirely around the brooder cage with less crowding than would otherwise be the case.

Furthermore when my brooder cages are moved away from the heating device unit, the chicks find no brooder compartment unit available to them. This is sometimes an advantage. Where chickens are fed from brooders having a dark warm brooder compartment, it is sometimes hard to get some of the chicks to come out of the brooder compartment. This difficulty never occurs with the structure herein explained.

The parts as will be seen from the foregoing are simple and not expensive. They are convenient for handling and manipulation and the system is very economical for raising chickens on a large scale.

I have found that I can make numerous changes in the type and construction of the heating units and in the details of the construction and arrangement of the brooder cage parts and I do not desire to limit myself to the particular structures here shown, which are illustrative, but I desire to cover by my claims any modified forms of structure which may be reasonably included within the scope of my claims.

I claim as my invention:

1. In a structure of the class described, the combination of a fixed heating unit, a portable brooder cage, said unit and cage having coacting parts for cooperating to form a brooder compartment at one end of the cage, when the cage and unit are moved together, said heating unit having spaced end members for forming side members, a flexible member for forming the front wall of such a brooder compartment and having a hinged member to form a rear wall of the brooder compartment.

2. In a brooder apparatus, a portable brooder cage, a fixed heater unit having members, including a movable door, for forming part of a brooder compartment, said members being arranged so that the cage may be moved to position for cooperating therewith, to form a brooder compartment at one end of the cage, of which said door forms an end, and a temperature responsive device for controlling the position of the door.

3. In a brooder apparatus, a portable brooder cage, a fixed heater unit having members, including a movable door, for forming part of a brooder compartment, said members being arranged so that the cage may be moved to position where said door forms one end of the cage, and a temperature responsive device mounted to be within the compartment with relation to the door, for controlling the position of the door.

4. An apparatus for heating brooders, comprising in combination with a room-like enclosure a heating means adjacent the wall thereof, a series of heater device units associated with the heating means, each having end walls and a back wall, one of said walls being movable, a temperature responsive device operatively associated with the movable wall, and brooder cages adapted to be moved to position for cooperating with the units, so that brooder compartments will be formed in portions of the cages.

5. An apparatus for heating brooders, comprising in combination with a room-like enclosure a heating means adjacent the wall thereof, a series of heater device units associated with the heating means, each having end walls and a back wall, one of said walls being movable, a temperature responsive device operatively associated with the movable wall, each unit having a flexible front wall, and brooder cages adapted to be moved to position for cooperating with the units so that brooder compartments will be formed in portions of the cages.

6. In a structure of the kind described, a fixed heater unit having parts adapted to form a top and walls of a brooder compartment and a portable self supporting brooder cage having perforated walls and a bottom, said brooder cage being adapted to be moved to position partially within said heater unit for providing a bottom therefor, and thereby forming, a substantially closed brooder compartment in part only of the brooder cage.

Des Moines, Iowa, July 31, 1930.
OSCAR W. SWANSON.